United States Patent
Choi

(10) Patent No.: US 10,277,015 B2
(45) Date of Patent: Apr. 30, 2019

(54) MOTOR CONTROL CENTER

(71) Applicant: LSIS CO., LTD., Anyang-si, Gyeonggi-do (KR)

(72) Inventor: Ejae Choi, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 156 days.

(21) Appl. No.: 15/412,001

(22) Filed: Jan. 21, 2017

(65) Prior Publication Data
US 2017/0250526 A1   Aug. 31, 2017

(30) Foreign Application Priority Data
Feb. 26, 2016   (KR) .................. 20-2016-0001076 U

(51) Int. Cl.
*A47B 88/483* (2017.01)
*H02B 1/36* (2006.01)
*H02B 1/38* (2006.01)

(52) U.S. Cl.
CPC ............. *H02B 1/36* (2013.01); *A47B 88/483* (2017.01); *H02B 1/38* (2013.01); *A47B 2210/0056* (2013.01)

(58) Field of Classification Search
CPC   A47B 88/483; A47B 2210/0056; H02B 1/01; H02B 1/34–1/38
See application file for complete search history.

(56) References Cited

U.S. PATENT DOCUMENTS

| | | | | |
|---|---|---|---|---|
| 2,034,669 A | * | 3/1936 | Slagle | A47B 57/00 211/134 |
| 2,530,336 A | * | 11/1950 | Marini | B65F 1/1436 220/263 |
| 3,142,003 A | * | 7/1964 | Olashaw | H02B 1/36 174/559 |
| 3,170,091 A | * | 2/1965 | Hudson | H02B 1/36 200/50.2 |
| 3,170,092 A | * | 2/1965 | Adams | H02B 1/21 174/133 B |

(Continued)

FOREIGN PATENT DOCUMENTS

| | | |
|---|---|---|
| JP | S63100907 | 6/1988 |
| JP | U05032812 | 4/1993 |

(Continued)

OTHER PUBLICATIONS

European Patent Office Application Serial No. 16203536.4, Search Report dated Jun. 21, 2017, 9 pages.

*Primary Examiner* — Robert J Hoffberg
(74) *Attorney, Agent, or Firm* — K&L Gates LLP

(57) ABSTRACT

A motor control center (MCC) includes a cabinet, a bus located within the cabinet, a partition vertically partitioning the inside of the cabinet, and an MCC unit located on the partition and including a clip connected to the bus, a first guide located on a lower surface of the MCC unit and having a protrusion part, and a second guide located on an upper surface of the partition and slidably guiding the first guide in a forward/backward direction, wherein the second guide has rise limiting parts limiting rise of the protrusion part in order to limit rise of the first guide, and thus, separation of the MCC unit is minimized, and since the MCC unit is mounted in a normal position, high reliability is obtained.

8 Claims, 9 Drawing Sheets

(56) References Cited

U.S. PATENT DOCUMENTS

| | | | | |
|---|---|---|---|---|
| 4,441,773 A | * | 4/1984 | Leiper | A47B 88/487 312/330.1 |
| 5,584,396 A | * | 12/1996 | Schmitt | H02B 1/36 211/26 |
| 7,190,574 B2 | * | 3/2007 | Muenzer | G06F 1/181 312/223.2 |
| 7,352,569 B2 | * | 4/2008 | Muenzer | G06F 1/181 312/223.2 |
| 8,208,261 B2 | * | 6/2012 | Fan | G06F 1/188 312/223.1 |
| 8,564,960 B2 | * | 10/2013 | Guo | G06F 1/187 248/222.13 |
| 10,054,750 B2 | * | 8/2018 | Hsu | A47B 88/423 |
| 10,085,556 B2 | * | 10/2018 | Chien | A47B 88/403 |
| 2012/0049713 A1 | * | 3/2012 | Tingle | A47B 88/42 312/334.33 |

FOREIGN PATENT DOCUMENTS

| | | |
|---|---|---|
| JP | 05285893 | 11/1993 |
| JP | 10184216 | 7/1998 |
| JP | 2010164031 | 7/2010 |
| KR | 2019990037647 | 10/1999 |
| KR | 100559146 | 3/2006 |
| KR | 20100091042 | 8/2010 |
| KR | 101387368 | 4/2014 |
| KR | 20150011130 | 1/2015 |
| KR | 101584795 | 1/2016 |
| WO | 2014095905 | 6/2014 |

* cited by examiner

MOTOR CONTROL CENTER

CROSS-REFERENCE TO RELATED APPLICATION

Pursuant to 35 U.S.C. § 119(a), this application claims the benefit of earlier filing date and right of priority to Korean Application No. 20-2016-0001076, filed on Feb. 26, 2016, the contents of which are all hereby incorporated by reference herein in its entirety.

BACKGROUND OF THE INVENTION

1. Field of the Invention

The present disclosure relates to a motor control center, and particularly, to a motor control center in which a motor control center (MCC) unit is mounted on a partition plate.

2. Background of the Invention

A motor control center (MCC) is a system for safely protecting a load device related to a motor installed in various industrial facilities.

The motor control center has a function of distributing low voltage electricity supplied from a transformer to a motor, and monitoring and preventing flowing of an overcurrent.

The motor control center may receive a plurality of electric control devices (or MCC units) in a cabinet (e.g., an iron enclosure), and the MCC units may be detachably installed in the cabinet.

In the motor control center, a plurality of electric control device (or an MCC unit) may be received in a cabinet (e.g., an iron enclosure) and may be detachably installed in the cabinet.

The motor control center may have a bus (bus bar) for supplying electricity to the interior, and the MCC unit may be moved as a drawer so as to be connected to the bus.

As a related art of the present disclosure, Korean Patent Utility Model No. 20-1998-010870 may be referred to.

SUMMARY OF THE INVENTION

Therefore, an aspect of the detailed description is to provide a motor control center (MCC) in which a movement of an MCC unit is restrained such that the MCC unit is stably installed without being separated.

To achieve these and other advantages and in accordance with the purpose of this specification, as embodied and broadly described herein, a motor control center (MCC) including a cabinet, a bus located within the cabinet, a partition vertically partitioning the inside of the cabinet, and an MCC unit located on the partition and including a clip connected to the bus, the MCC may include: a first guide located on a lower surface of the MCC unit and having a protrusion part; and a second guide located on an upper surface of the partition and slidably guiding the first guide in a forward/backward direction, wherein the second guide has rise limiting parts limiting rise of the protrusion part.

The second guide may include a pair of side guides facing each other and a rear stopper linking rear ends of the pair of side guides, and the rise limiting parts may be provided in the pair of side guides, respectively.

The first guide may include a main body part inserted between the pair of side guides, and the protrusion part may protrude from a side surface of the main body part so as to be stepped.

The protrusion part may be positioned between the rise limiting parts and the partition.

The protrusion part may be spaced apart from a lower surface of the MCC unit in a vertical direction below the MCC unit, and the rise limiting parts may be spaced apart from an upper surface of the partition in a vertical direction above the partition.

The sum of a thickness of the protrusion part and a thickness of the rise limiting parts may be equal to or greater than a height of the main body part.

The MCC may further include guide rails installed on an upper surface of the partition and guiding sliding of the MCC unit in a forward/backward direction, wherein side protrusions protrude from a side surface of the MCC unit, and guide slits slidably guiding the side protrusion in a forward/backward direction are provided in the guide rails, respectively.

The guide slits may be provided to extend in a forward/backward direction from a front end of the guide rails, respectively.

The first guide may be provided in plurality on a lower surface of the MCC unit, the plurality of first guides may be located in different horizontal position and vertical position on a lower surface of the MCC unit, and the second guide may be provided to correspond to the number of the first guide and located in positions corresponding to the positions where the first guide is disposed.

According to embodiments of the present disclosure, since the second guide slidably guiding the first guide in a forward/backward direction limits rise of the first guide, separation of the MCC unit may be minimized, and since the MCC unit is mounted in a normal position, high reliability may be obtained.

Also, since movement of the first guide is limited in a horizontal direction by the pair of side guides and in a vertical direction by the rise limiting parts and the partition, distorted installation of the MCC unit may be minimized.

Also, the clip may be connected to the bus with high accuracy, without causing an erroneous connection.

Also, since the side protrusion protruding to a side surface of the MCC unit is slidably guided in a forward/backward direction along the guide slit of the guide rail, the side surface of the MCC unit may stably slide to the guide rail and separation of the MCC unit may be minimized.

Also, the side protrusion protruding to a side surface of the MCC unit may smoothly enter the guide slit on a rear side of the guide rail.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
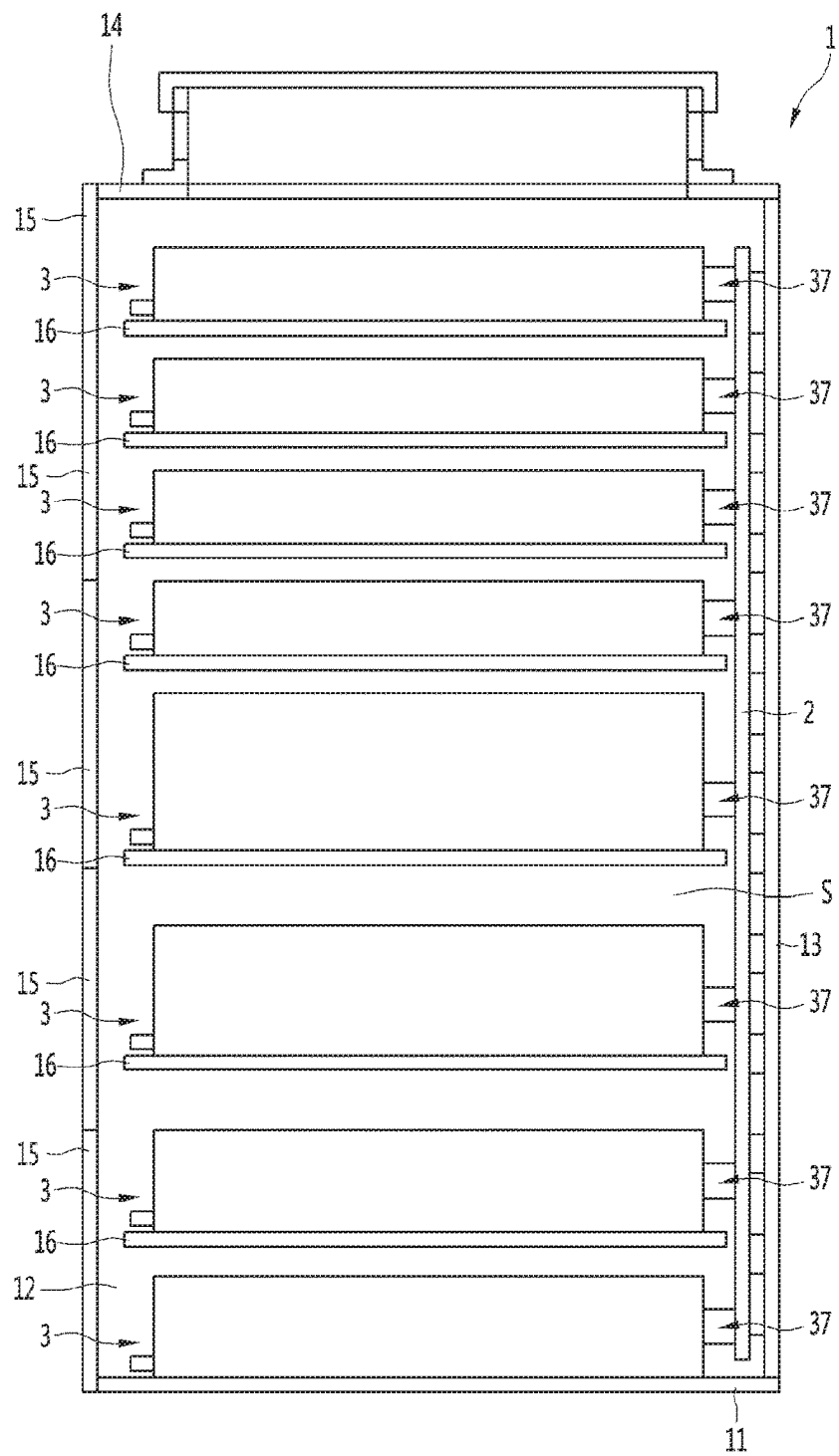
FIG. 1 is a side view illustrating an interior of a motor control center (MCC) according to an embodiment of the present disclosure.
Figure 2:
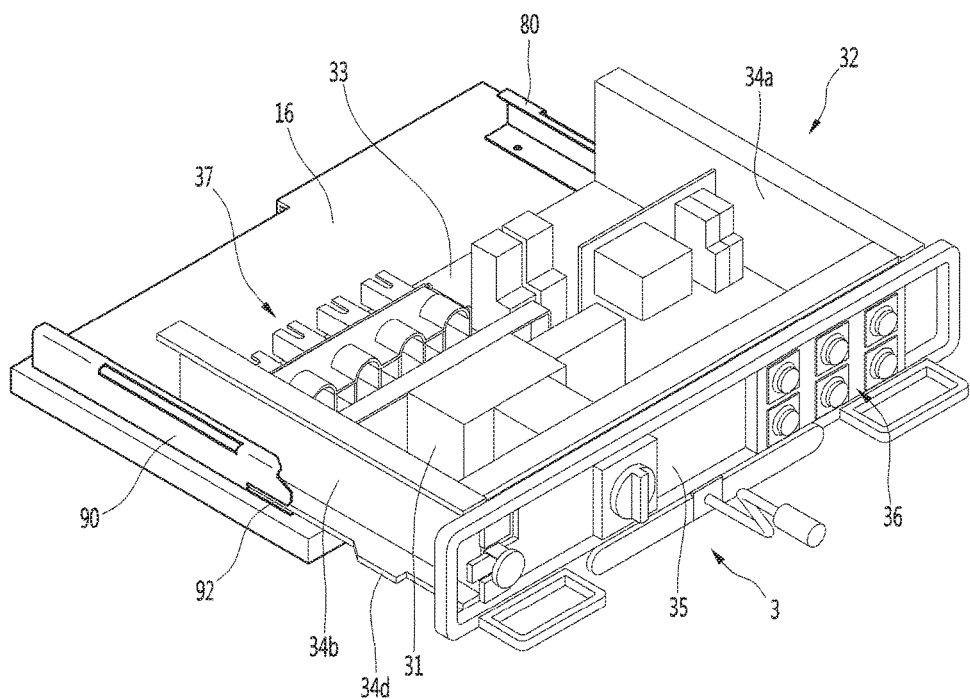
FIG. 2 is a perspective view illustrating an MCC unit and a partition plate of an MCC according to an embodiment of the present disclosure.
Figure 3:
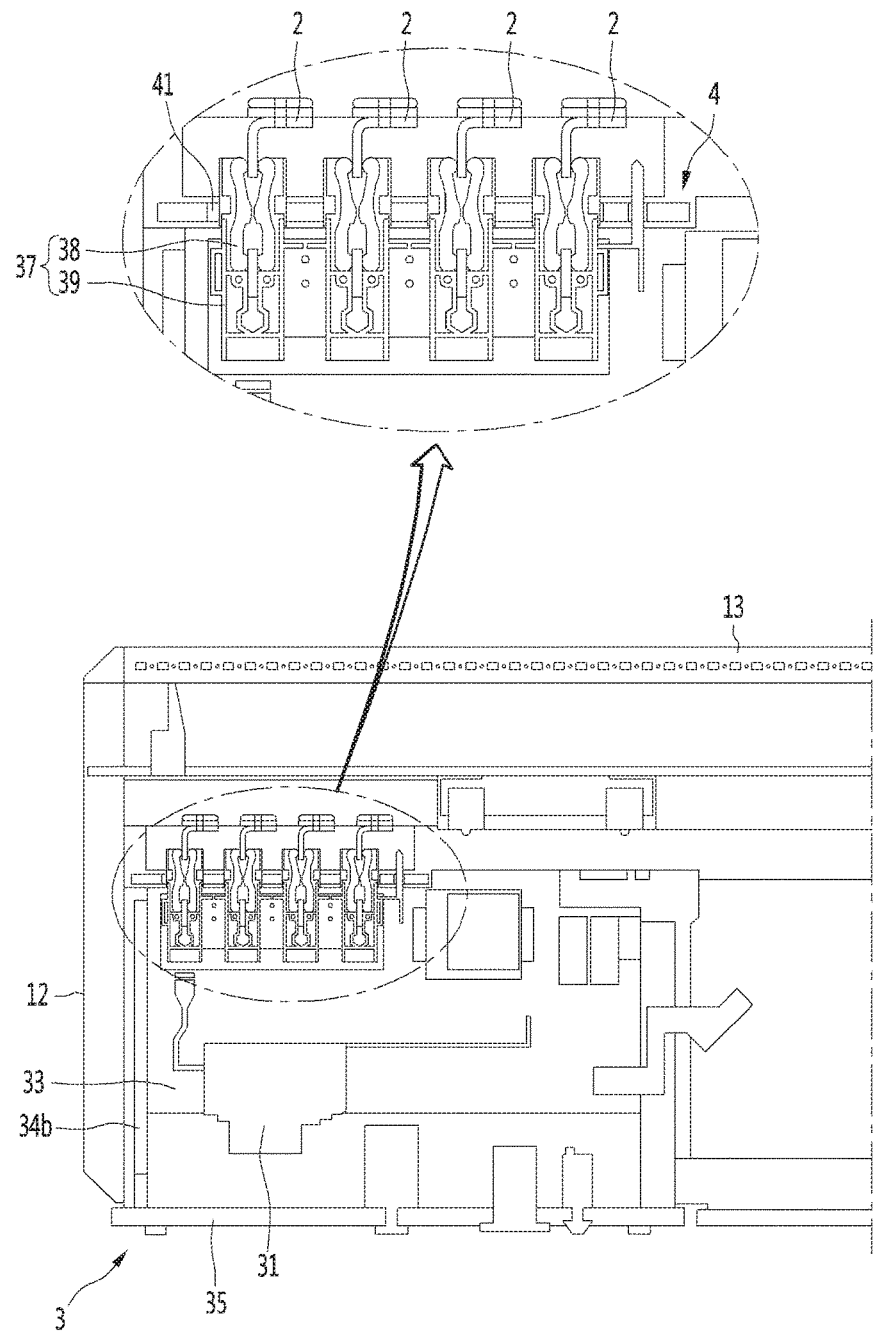
FIG. 3 is an enlarged cross-sectional view illustrating a state in which a clip installed in an MCC unit of an MCC is connected to a bus according to an embodiment of the present disclosure.

Hereinafter, a specific embodiment of the present disclosure will be described in detail with reference to the accompanying drawings. FIG. 1 is a side view illustrating an interior of a motor control center (MCC) according to an embodiment of the present disclosure, FIG. 2 is a perspective view illustrating an MCC unit and a partition plate of an MCC according to an embodiment of the present disclosure, and FIG. 3 is an enlarged cross-sectional view illustrating a state in which a clip installed in an MCC unit of an MCC is connected to a bus according to an embodiment of the present disclosure.

A motor control center (MCC) includes a cabinet 1, a bus 2, and an MCC unit 3.

The cabinet 1 may form an appearance of the MCC. The cabinet 1 may have a space S for accommodating the bus 2 and the MCC unit 3. The cabinet 1 may be open at one side thereof. The MCC unit 3 may enter through the open side of the cabinet 1.

The cabinet 1 may include a base 11, a pair of side body 12 and rear body 13 located on the base 11, and a top cover 14 located on the pair of side body 12 and rear body 13.

A door 15 for opening and closing the space S may be rotatably connected to the cabinet 1. The door 15 may be installed in plurality to divide and open the space S.

The MCC includes a partition 16 located within the cabinet 1 and partitioning the inside of the cabinet 1.

The partition 16 may be horizontally located within the cabinet 1. The partition 1 may be coupled to the side body 12 of the cabinet 1.

The partition 16 may be provided in plurality within the cabinet 1, and the plurality of partitions 16 may be located to be spaced apart from each other vertically in the space S.

The partition 16 may be installed such that a rear end thereof is spaced apart from the rear body 13, and a gap may be provided between the rear end of the partition 16 and the rear body 13. The partition 16 may be installed such that the rear end thereof is not in contact with the bus 2.

The bus 2 may be located to extend in a vertical direction within the cabinet 1. The bus 2 may be located to be closer to the rear body 13, among the door 15 and the rear body 13. The bus 2 may be located on a rear side, among a front side and the rear side, within the cabinet 1.

The bus 2 may be connected to the MCC unit 3. The bus 2 may be fixedly positioned in the cabinet 1, and the MCC unit 3 may be moved from a front side of the bus 2 toward the bus 2 so as to be connected to the bus 2. The bus 2 may be a vertical bus located to extend in a vertical direction in the space S. The bus 2 may be provided in plurality in the space S. The plurality of buses 2 may be located to be spaced apart from each other in a horizontal direction within the cabinet 1. The plurality of buses 2 may be connected to the MCC units 3, respectively.

The MCC 3 unit may be a motor control unit controlling rotation of a motor by selectively supplying power required for the motor or changing a supply direction of power.

The MCC unit 3 may be mounted on the partition 16. In the MCC, a plurality of MCC units 3 may be installed in the cabinet 1.

Some of the plurality of MCC units 3 may be insertedly positioned between a pair of partitions 16. An MCC unit positioned at the uppermost side, among the plurality of MCC units 3, may be insertedly located between a partition 16 positioned at the uppermost side, among the plurality of partitions 16, and the top cover 14. An MCC unit positioned at the lowermost side, among the plurality of MCC units 3, may be insertedly located between the case 11 and a partition 16 positioned at the lowermost side, among the plurality of partitions 16.

Hereinafter, for the purposes of description, a single MCC unit 3 will be described as an example.

The MCC unit 3 may include a circuit breaker 31 interrupting an electric circuit and a drawer 32 in which the circuit breaker 31 is installed.

The circuit breaker 31 may be configured as a molded case circuit breaker (MCCB).

The drawer 32 may have a shape in which a front side, an upper side, and a rear side thereof are open. The drawer 32 may have a shape in which a lower side and left and right sides are closed. The drawer 32 may include a lower plate 33 and a pair of side plates 34a and 34b erected on the lower plate 33.

The MCC unit 3 may include a front door 35 opening and closing the front side of the drawer 32. The front door 35 may be connected to rotate about one of left and right sides of the drawer 32.

The MCC unit 3 may further include a display assembly 36 installed on the drawer 32. The display assembly 36 may include at least one lamp displaying operation information of the MCC unit 3.

The MCC unit 3 may include a clip 37 connected to the bus 2. As illustrated in FIG. 3, the clip 37 may include a clip member 38 and a clip case 39 surrounding an outer circumference of the clip member 38. The clip 37 may be installed in a position on a rear side within the drawer 32. The clip 37 may be installed in the lower plate 33.

The MCC unit 3 may be mounted on the partition 16, and when the MCC unit 3 is moved in a direction toward the bus 2, the clip 37 may be connected to the bus 2. In the MCC unit 3, the clip 37 may be connected to the bus 2

Figure 4:
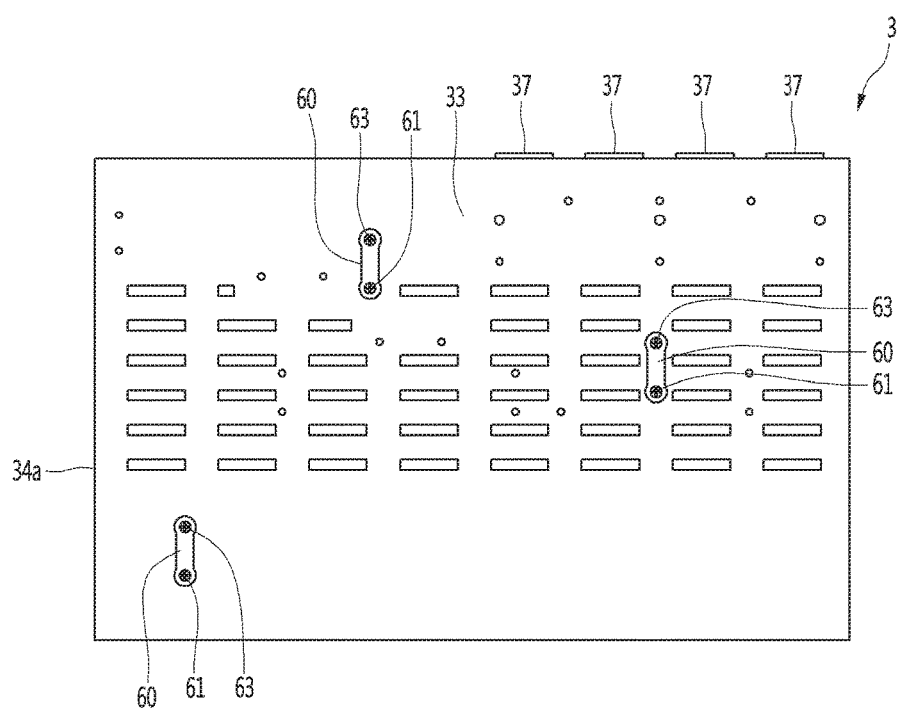
FIG. 4 is a bottom view of an MCC unit of an MCC according to an embodiment of the present disclosure.
Figure 5:
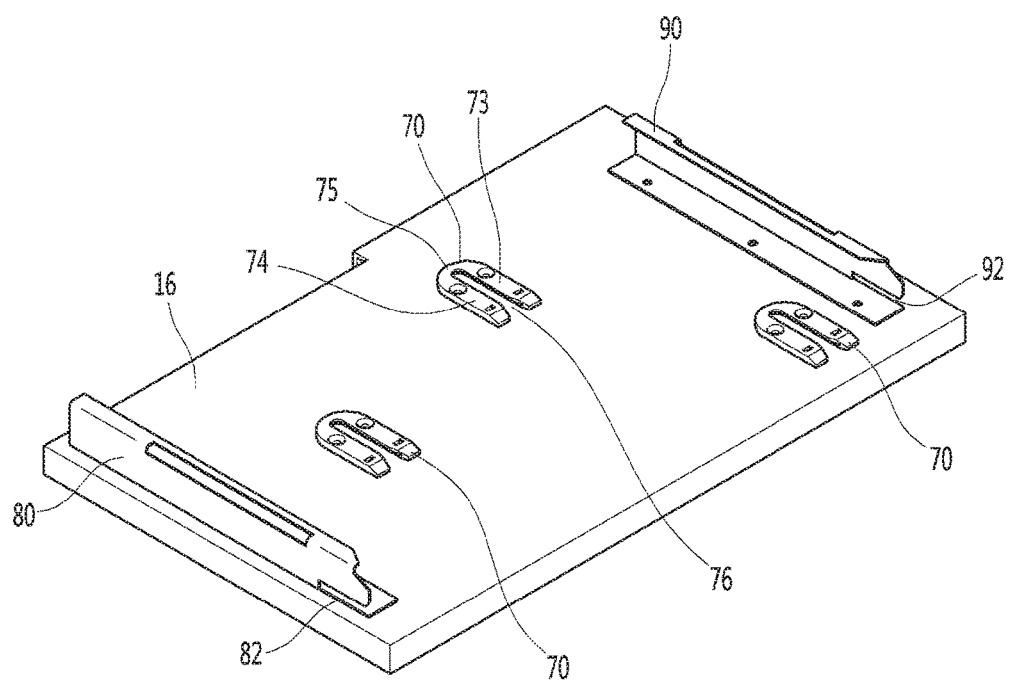
FIG. 5 is a perspective view illustrating an upper surface of a partition plate of an MCC according to an embodiment of the present disclosure.
Figure 6:
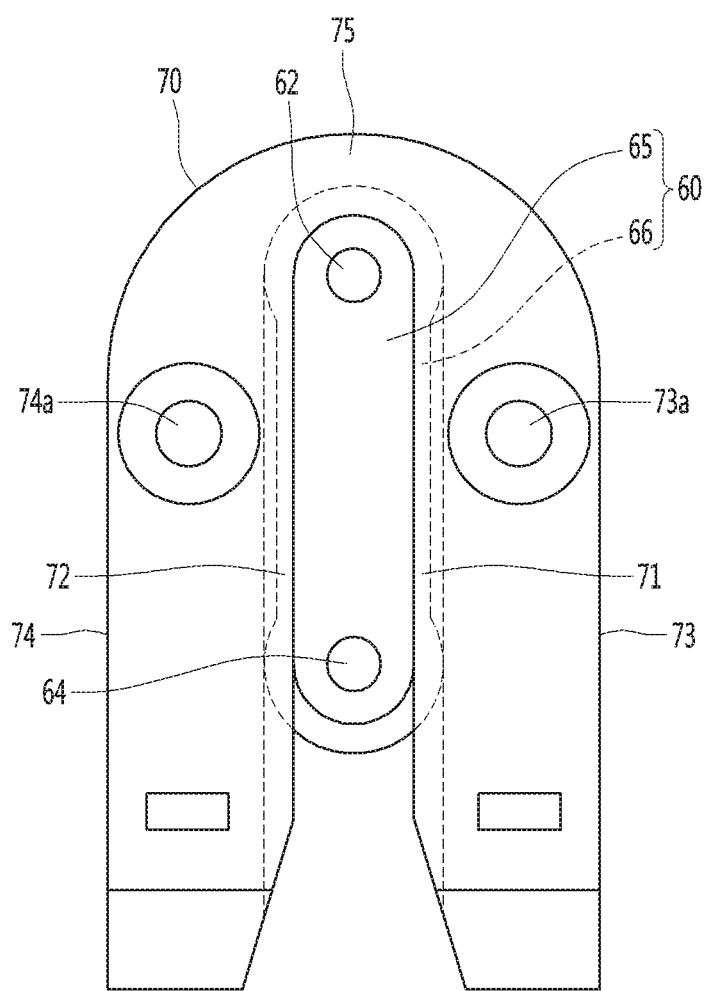
FIG. 6 is a plan view illustrating a configuration in which a first guide illustrated in FIG. 4 is slidably mounted on a second guide illustrated in FIG. 5.
Figure 7:
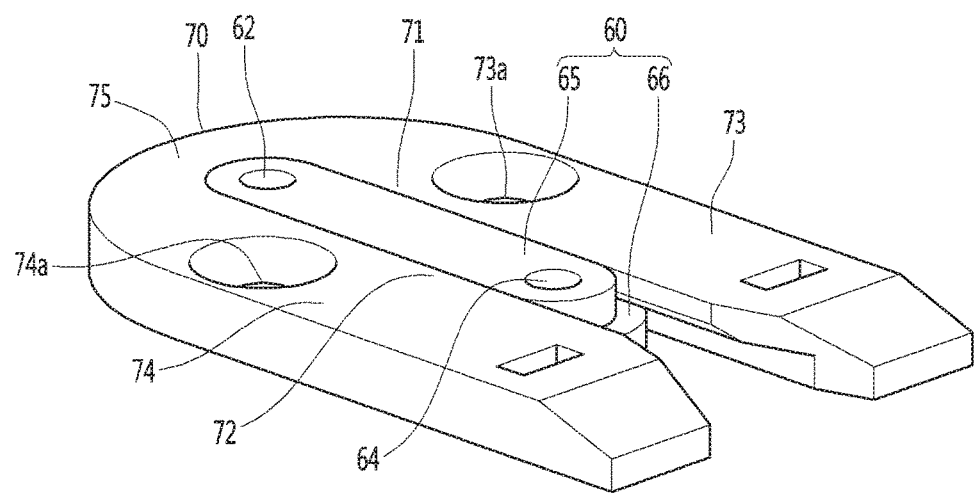
FIG. 7 is a perspective view illustrating a state in which the first guide illustrated in FIG. 4 is slidably mounted on the second guide illustrated in FIG. 5.
Figure 8:
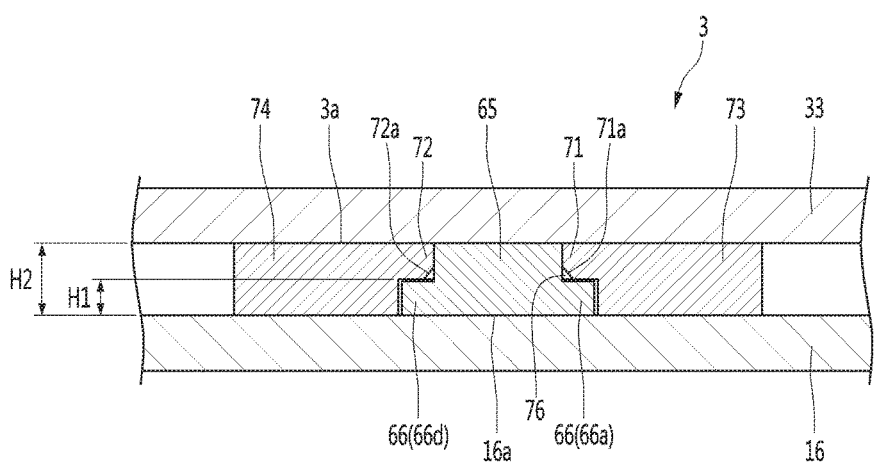
FIG. 8 is a cross-sectional view illustrating a state in which the first guide illustrated in FIG. 4 is slidably mounted on the second guide illustrated in FIG. 5.
Figure 9:
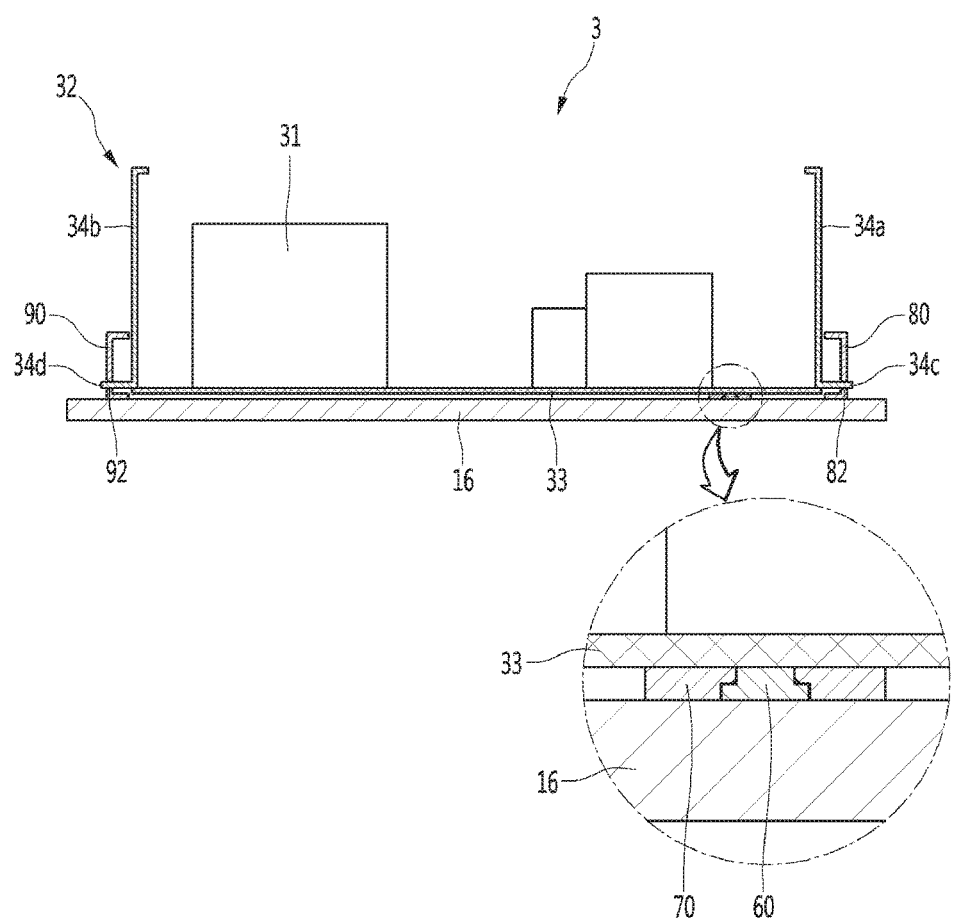
FIG. 9 is a cross-sectional view illustrating a state in which an MCC unit of an MCC is completely mounted on a guide rail according to an embodiment of the present disclosure.

FIG. 4 is a bottom view of an MCC unit of an MCC according to an embodiment of the present disclosure, FIG. 5 is a perspective view illustrating an upper surface of a partition plate of an MCC according to an embodiment of the present disclosure, FIG. 6 is a plan view illustrating a configuration in which a first guide illustrated in FIG. 4 is slidably mounted on a second guide illustrated in FIG. 5, FIG. 7 is a perspective view illustrating a state in which the first guide illustrated in FIG. 4 is slidably mounted on the second guide illustrated in FIG. 5, FIG. 8 is a cross-sectional view illustrating a state in which the first guide illustrated in FIG. 4 is slidably mounted on the second guide illustrated in FIG. 5, and FIG. 9 is a cross-sectional view illustrating a state in which an MCC unit of an MCC is completely mounted on a guide rail according to an embodiment of the present disclosure.

The MCC may include a first guide 60 located on a lower surface of the MCC unit 3 and a second guide 70 located on an upper surface of the partition 16 and slidably guiding the first guide 60 in a forward/backward direction.

The first guide 60 may be located on a lower surface of the MCC unit 3. The first guide 60 may be located to extend in a forward/backward direction.

The first guide 60 may be provided in plurality on a lower surface of the MCC unit 3. The plurality of first guides 60 may be located in a horizontal position and a vertical position different to each other on the lower surface of the MCC unit 3 (please refer to FIG. 4).

The first guide 60 may be fastened to the lower plate 33 of the MCC unit 3 through a fastening member such as a screw, or the like.

The first guide 60 may be provided to extend in a forward/backward direction. Referring to FIGS. 4 and 7, a rear through hole 62 through which a fastening member 61 such as a screw, or the like, penetrates may be provided in the first guide 60. A front through hole 64 through which a fastening member 63 such as a screw, or the like, penetrates may be provided in the first guide 60. The rear through hole 62 and the front through hole 64 may be spaced apart from each other in a forward/backward direction.

Referring to FIGS. 6 to 8, the first guide 60 may include a main body part 65 and a protrusion part 66 protruding from the main body part 65.

The main body part 65 may include the rear through hole 62 and the front through hole 64, and may be fastened to the MCC unit 3 through a fastening member such as a screw, or the like.

The main body part 65 may be provided to extend in a forward/backward direction. The rear through hole 62 and the front through hole 64 may be provided to extend in a forward/backward direction in the main body part 65.

The protrusion part 66 may protrude from a side surface of the main body part 65. The protrusion part 66 may protrude in a lateral direction from a lower portion of the main body part 65. The protrusion part 66 may be provided to protrude in a leftward direction and a rightward direction from side surfaces of a lower portion of the main body part 65. The protrusion part 66 may be provided to be stepped in the main body part 65. The protrusion part 66 may protrude to be stepped on a side surface of the main body part 65.

The protrusion part 66 may be provided to extend along an outer circumference of the main body part 65. A height H1 of the protrusion part 66 may be lower than a height H2 of the main body part 65.

The main body part 65 may be fastened to the MCC unit 3 such that an upper surface thereof is in contact with a lower surface 3a of the MCC unit 3.

The main body part 65 may be inserted into a pair of side guides 73 and 74 (to be described hereinafter) of the second guide 70.

The protrusion part 66 may be spaced apart from the lower surface 3a of the MCC unit 3 below the lower surface of the MCC unit 3 in a vertical direction.

The protrusion part 66 may include a left protrusion part 66a formed to protrude from the main body part 65 in a leftward direction and a right protrusion part 66d protruding from the main body part 65 in a rightward direction.

The protrusion part 66 may be positioned between rise limiting parts 71 and 72 (to be described hereinafter) and the partition 16.

The second guide 70 is located in plurality on an upper surface of the partition. The second guide 70 may be provided by the same number as that of the first guide 60, and maybe provided in a position corresponding to a position where the first guide 60 is located on the upper surface of the partition 16. Thus, when the first guide 60 and the second guide 70 are coupled, the first guide 60 and the second guide 70 form three-point support on the coupled planar surface, securing stable bearing capacity. That is, a resistance force may be provided with respect to a force in a certain direction.

The second guide 70 may have the rise limiting parts 71 and 72 limiting rising of the protrusion part 66.

The second guide 70 may include a pair of side guides 73 and 74 facing each other and a rear stopper 75 linking rear ends of the pair of side guides 73 and 74.

A first guide accommodation space 76 accommodating a first guide may be provided between the pair of side guides 73 and 74.

The rise limiting parts 71 and 72 may be provided in the pair of the side guides 73 and 74, respectively.

The pair of side guides and the rear stopper 75 may be located to be in contact with an upper surface of the partition 16 in lower surfaces thereof.

Through holes 73a and 74a allowing the second guide 70 to be fastened to the partition 16 by a fastening member such as a screw, or the like, may be provided on the pair of side guides 73 and 74, respectively.

The rise limiting parts 71 and 72 may be spaced apart from an upper surface 16a of the partition 16 in a vertical direction on the upper surface 16a of the partition 16.

The rise limiting parts 71 and 72 may include a left rise limiting part 71 and the right rise limiting part 72.

The left rise limiting part 71 may protrude from a right upper portion of the left guide 73 positioned on the left side in a direction toward a left upper portion of the right guide 74 positioned on the right side.

When the first guide 60 is completely sled to the second guide 70, the left rise limiting part 71 may be positioned on the left protrusion part 66a, and when the left protrusion part 66a is moved in an upward direction, the left protrusion part 66a may be caught in an upward direction.

The sum of thicknesses of the left rise limiting part 71 and the left protruding part 66a may be equal to or greater than the height H2 of the main body part 65. Thus, when the first guide 60 slides to the second guide 70, the first guide 6 is shrink-fit to the second guide 70, so that the MCC unit 3 may be stably positioned, without being delaminated from the partition 16.

The right rise limiting part 72 may protrude from a left upper portion of the right guide 74 in a direction toward a right upper portion of the left guide 73.

When the first guide 60 completely slides to the second guide 70, the right rise limiting part 72 may be positioned on the right protrusion part 66d, and when the right protrusion part 66d is moved in an upward direction, the right protrusion part 66d may be caught in the upward direction.

The sum of thicknesses of the right rise limiting part 72 and the right protruding part 66d may be equal to or greater than the height H2 of the main body part 65. Thus, when the first guide 60 slides to the second guide 70, the first guide 60 is shrink-fit to the second guide 70, so that the MCC unit 3 may be stably positioned, without being delaminated from the partition 16.

The left rise limiting part 71 and the right rise limiting part 72 may be provided such that thicknesses thereof are reduced toward each other. As for the left rise limiting part 71 and the right rise limiting part 72, a lower surface 72a may be formed to be sloped.

Meanwhile, the MCC may further include guide rails 80 and 90 installed on an upper surface of the partition 16 and guiding sliding of the MCC unit 3 in a forward/backward direction. Also, side protrusions 34c and 34d may protrude from side surfaces of the MCC unit 3.

Referring to FIG. 9, the side protrusions 34c and 34d may include a left protrusion 34c and a right protrusion 34d.

The left protrusion 34c may be formed to protrude from a left plate 34a positioned on the left side, among a pair of side plates 34a and 34b, in a leftward direction.

The right protrusion 34d may be formed to protrude from the right plate 34a positioned on the right side, among the side plates 34a and 34b, in a rightward direction.

The guide rails 80 and 90 may be located to extend in a forward/backward direction. The guide rails 80 and 90, as a pair, may be spaced apart from each other in a horizontal direction. The pair of guide rails 80 and 90 may include a left guide rail 80 positioned on the left side and a right guide rail 90 positioned on the right side.

The guide rails 80 and 90 may have guide slits 82 and 92 slidably guiding the side protrusions 34c and 34d in a forward/backward direction, respectively.

The guide slits 82 and 92 may be formed to extend in a forward/backward direction from front ends of the guide rails 80 and 90, respectively. The guide slits 82 and 92 may be formed such that front ends thereof are open and rear ends thereof are closed, respectively.

The left guide slit 82 may be formed to extend in a forward/backward direction in the left guide rail 80. Also, the right guide slit 92 may be formed to extend in a forward/backward direction in the right guide rail 90. The left guide slit 82 and the right guide slit 92 may be provided to face each other in a horizontal direction.

Hereinafter, operations of the present disclosure configured as described above will be described.

First, as illustrated in FIG. 2, the MCC unit 3 may be slidably mounted on the partition 16, and may enter between the pair of guide rails 80 and 90.

When the MCC unit 3 is installed, the first guide 60 installed on a lower surface of the MCC unit 3 may enter the second guide 70 installed on an upper surface of the partition 16 and may be slidably guided to the second guide 70 in a backward direction. Also, when the MCC unit 3 is installed, the side protrusions 34c and 34d of the MCC unit 3 enter the guide slits 82 and 92 of the guide rails 80 and 90 so as to be slidably guided in a backward direction along the guide slits 82 and 92, respectively.

Hereinafter, a process of causing the first guide 60 to slide to the second guide 70 will be described in detail.

First, in a state in which the first guide 60 is fastened to the lower plate 33 of the MCC unit 3 by a fastening member such as a screw, or the like, the first guide 60 may slide together with the MCC unit 3 on an upper surface of the partition 16.

The first guide 60 may be inserted into the second guide 70. The first guide 60 may slide between the pair of side guides 73 and 74 and may be guided by the pair of side guides 73 and 74 in a backward direction. The first guide 60 may not be released in a leftward direction due to the presence of the left guide 73 and may not be released in a rightward direction due to the presence of the right guide 74. Also, the protrusion part 66 of the first guide 60 may not be released in an upward direction due to the presence of the rise limiting parts 71 and 72 and may not be released in a downward direction due to the presence of the partition 16. Also, when the first guide 60 is inserted in the back of the second guide 70, the first guide 60 is not released in a backward direction due to the presence of the rear stopper 75.

When the first guide 60 is inserted into the first guide accommodation space 76 of the second guide 70, the first guide 60 may be separated only in a forward direction and a movement thereof in a leftward direction, a rightward direction, an upward direction, and a downward direction, and a backward direction may be limited.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A motor control center (MCC) including a cabinet, a bus located within the cabinet, a partition vertically partitioning the inside of the cabinet, and an MCC unit located on the partition and including a clip connected to the bus, the MCC comprising:
    a first guide located on a lower surface of the MCC unit and having a protrusion part; and
    a second guide located on an upper surface of the partition and slidably guiding the first guide in a forward/backward direction,
    wherein the second guide has rise limiting parts limiting rise of the protrusion part,
    wherein the MCC further comprises:
        guide rails installed on the upper surface of the partition and guiding sliding of the MCC unit in the forward/backward direction, wherein side protrusions protrude from a side surface of the MCC unit, and
        guide slits slidably guiding the side protrusions in the forward/backward direction are provided in the guide rails, respectively.

2. The motor control center of claim 1, wherein the second guide includes a pair of side guides facing each other and a rear stopper linking rear ends of the pair of side guides, and the rise limiting parts are provided in the pair of side guides, respectively.

3. The motor control center of claim 1, wherein the first guide includes a main body part inserted between a pair of side guides, and the protrusion part protrudes from a side surface of a lower portion of the main body part so as to be stepped.

4. The motor control center of claim 3, wherein a sum of a thickness of the protrusion part and a thickness of a respective one of the rise limiting parts is equal to or greater than a height of the main body part.

5. The motor control center of claim 1, wherein the protrusion part is positioned between the rise limiting parts and the partition.

6. The motor control center of claim 1, wherein the protrusion part is spaced apart from the lower surface of the MCC unit, and the rise limiting parts are spaced apart from the upper surface of the partition.

7. The motor control center of claim 1, wherein the guide slits are provided to extend in the forward/backward direction from a front end of the guide rails, respectively.

8. The motor control center of claim 1, wherein the first guide is provided in a plurality on the lower surface of the MCC unit, the plurality of first guides are located in different horizontal positions in a width direction of the cabinet and vertical positions in the forward/backward direction on the lower surface of the MCC unit, and the second guide is provided in a plurality to correspond to a number of the plurality of first guides and located in positions corresponding to the different horizontal positions where the plurality of first guides are disposed.

* * * * *